US009588853B2

(12) United States Patent
Harper et al.

(10) Patent No.: US 9,588,853 B2
(45) Date of Patent: Mar. 7, 2017

(54) AUTOMATIC MANAGEMENT OF SERVER FAILURES

(71) Applicant: International Business Machines Corporation, Armonk, NY (US)

(72) Inventors: Richard E. Harper, Chapel Hill, NC (US); Valentina Salapura, Chappaqua, NY (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 14/296,791

(22) Filed: Jun. 5, 2014

(65) Prior Publication Data
US 2015/0355983 A1    Dec. 10, 2015

(51) Int. Cl.
G06F 11/00 (2006.01)
G06F 11/20 (2006.01)

(52) U.S. Cl.
CPC ...... G06F 11/2033 (2013.01); G06F 11/2046 (2013.01); G06F 11/2028 (2013.01); G06F 11/2041 (2013.01); G06F 2201/815 (2013.01)

(58) Field of Classification Search
CPC ............... G06F 11/2033; G06F 11/203; G06F 11/2056; G06F 11/2064; G06F 11/2069; G06F 11/2087; G06F 11/20
See application file for complete search history.

(56) References Cited

U.S. PATENT DOCUMENTS

| 7,487,390 | B2  |   | 2/2009  | Saika |
|-----------|-----|---|---------|-------|
| 7,694,189 | B2  |   | 4/2010  | Van Riel et al. |
| 8,577,795 | B2  | * | 11/2013 | Clubb .................. G06Q 20/105 705/39 |
| 2007/0011495 | A1 | * | 1/2007 | Armstrong .......... G06F 11/2046 714/39 |
| 2008/0301487 | A1 | * | 12/2008 | Hatta .................. G06F 11/2025 714/3 |
| 2011/0314470 | A1 |   | 12/2011 | Elyashev et al. |
| 2012/0084071 | A1 | * | 4/2012 | Cyr ..................... G06F 11/0793 703/25 |
| 2013/0024567 | A1 |   | 1/2013 | Roxburgh et al. |

* cited by examiner

Primary Examiner — Bryce Bonzo
Assistant Examiner — Katherine Lin
(74) Attorney, Agent, or Firm — Yee & Associates, P.C.; Louis J. Percello

(57) ABSTRACT

In embodiments of the invention LPARs can be run on any server in a group of servers. Upon detecting a server has failed, each LPAR then running on the failed server is identified, and servers in the group that are available for restarting the identified LPARs are determined. Identified LPARs are assigned to an available server for restarting, wherein each LPAR has a value associated with a specified LPAR priority criterion, and a given LPAR is assigned in accordance with its value. Responsive to assigning the given LPAR to an available server, a specified storage resource is connected for use by the server in association with the given LPAR, wherein the specified storage resource was previously connected for use by the failed server in association with the given LPAR.

16 Claims, 6 Drawing Sheets

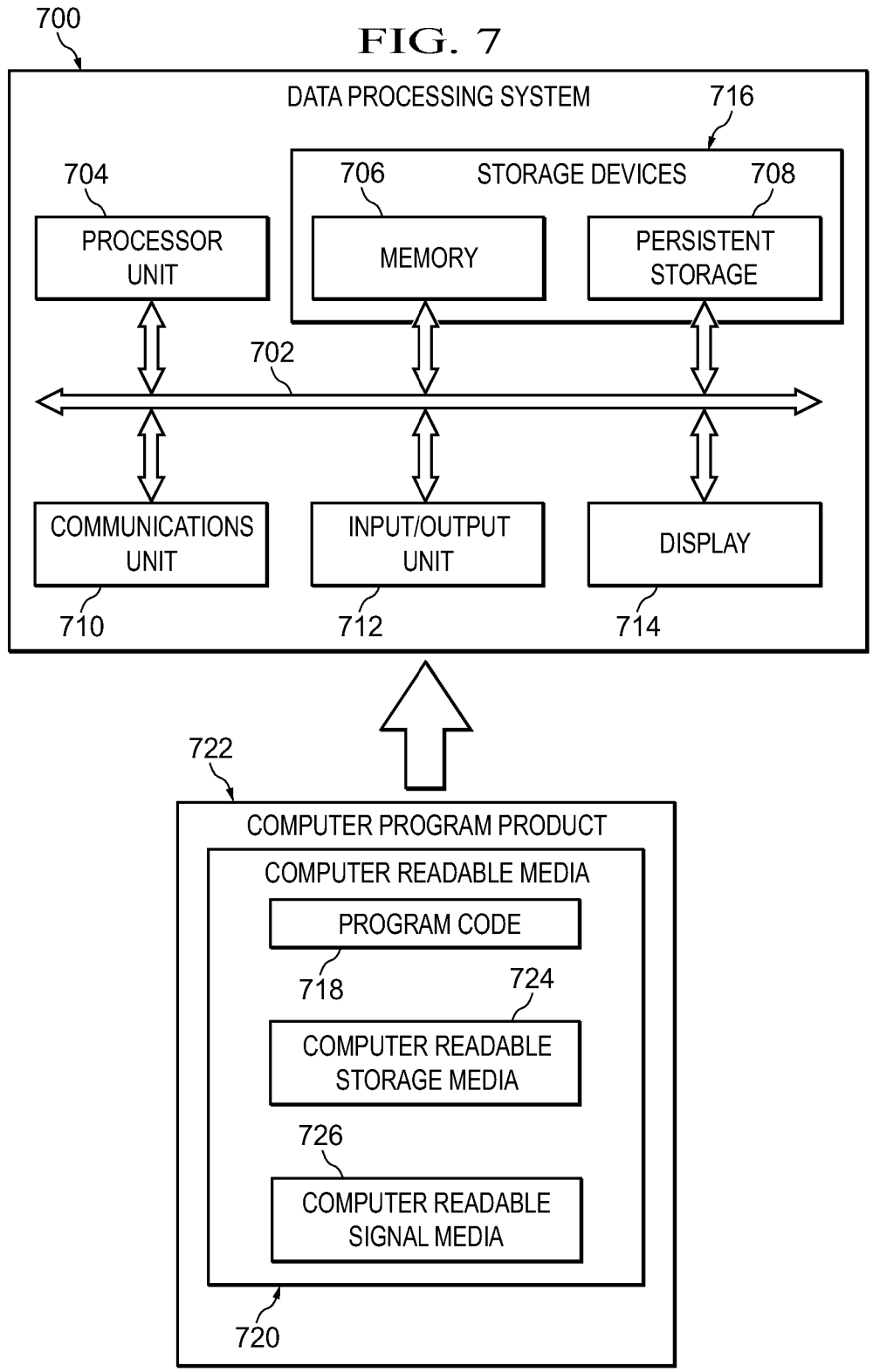

AUTOMATIC MANAGEMENT OF SERVER FAILURES

BACKGROUND

Field of the Invention

The invention disclosed and claimed herein generally pertains to detecting that a server, on which one or more logical partitions (LPARs) and their workloads are running, has failed or become defective. Affected LPARs are automatically restarted on one or more alternate servers.

Description of the Related Art

In a virtual environment, a logical partition (LPAR) is a subset of the hardware resources of a computer, wherein the subset is virtualized as a separate computer. Thus, a physical machine can be partitioned into multiple LPARs, with each LPAR hosting a separate operating system, and each LPAR assigned to implement a particular workload or application.

It is common in distributed virtual environments to provide a capability for detecting the failure of a physical server. Virtual resources affected by the failure may then be restarted on another server. It would be desirable to provide an enhanced system and method for automatically performing these functions.

SUMMARY

In embodiments of the invention, multiple servers are arranged in a group or cluster, wherein an LPAR running on one of the servers can also be run on another server. Thus, the servers of the group are able to back each other up. When a given server fails, LPARs that were running on the failed server are assigned or distributed to other servers of the group, in a prioritized order, and respectively restarted on those servers. Each LPAR has an associated priority criterion value, and this value determines the priority a given LPAR has in being assigned to another server. In embodiments of the invention, a very useful priority criterion value for an LPAR can be its associated Service Level Agreement (SLA) value, as described hereinafter in further detail.

As an additional feature of embodiments of the invention, during migration of a given LPAR from a failed server to an operating failover server, a specified storage disk or other storage resource or component is dynamically reconnected to the operating server from the failed server. This specified storage disk was previously used by the failed server in connection with the given LPAR. Accordingly, the specified storage disk contains significant data pertaining to the given LPAR. Also, a network with which the given LPAR communicates is furnished with information pertaining to the new position of the given LPAR with respect to the operating failover server, to enable continued communication.

An embodiment of the invention comprises a method directed to a computer environment wherein one or more logical partitions (LPARs) can each be run on any server in a specified group of servers. Responsive to detecting that one of the servers has failed, the method identifies each LPAR which had been running on the failed server. The method further comprises determining which servers in the group of servers are available for use in restarting one or more of the identified LPARs. One or more identified LPARs are assigned to an available server for restarting, wherein each LPAR has a value associated with a specified LPAR priority criterion, and the priority of assigning a given identified LPAR is based on its value. Responsive to assigning the given LPAR to a given available server, a specified storage resource is connected for use by the given available server in association with the given LPAR, wherein the specified storage resource was previously connected for use by the failed server in association with the given LPAR.

BRIEF DESCRIPTION OF THE SEVERAL VIEWS OF THE DRAWINGS

FIG. 7 is a block diagram showing a computer or data processing system that may be used in implementing embodiments of the invention.

DETAILED DESCRIPTION

Figure 1:
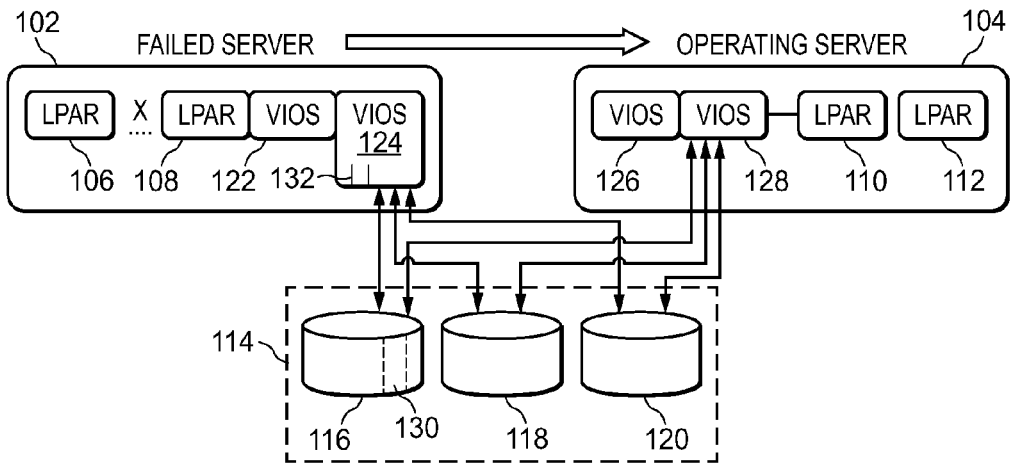
FIG. 1 is a schematic diagram showing a failed server and an operating failover target server, together with a storage area network (SAN) or the like, for use in illustrating an embodiment of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 1, there are shown servers 102 and 104 on which LPARs as described above can be run. FIG. 1 more particularly shows LPARs 106 and 108 to be run on server 102, and LPARs 110 and 112 to be run on server 104. Moreover, servers 102 and 104 are both arranged in a group or cluster as described above, wherein respective servers of the group back up each other. Thus, if LPARs are running on one of the servers 102 or 104, and that LPAR fails, the LPARs can be readily migrated to the other server and restarted thereon. In accordance with an embodiment of the invention, the process of migrating or transferring respective LPARs from a failed server to an operating server may be carried out automatically and/or remotely. As a result, the effects of server failure on the operation of particular LPARs can be minimized significantly.

FIG. 1 further shows a storage resource such as a storage area network (SAN) 114, comprising exemplary storage disks 116, 118 and 120. Respective disks of SAN 114 are connected to LPARs of server 102, through virtual I/O server VIOS 124 of server 102.

Moreover, the storage disks are each divided into data storage partitions, such as storage partition 130 of disk 116. In an exemplary embodiment, data generated in connection with LPAR 108 as it carries out its workload is stored in the partition 130 by means of a virtual Small Computer System Interface (vSCSI) device (not shown), which resides in a SCSI slot 132 in VIOS 124 of server 102. The SCSI slot 132 is identified by a particular slot number, and is expressly mapped to the data storage partition 130 of SAN disk 116. As a result, a storage partition which contains data pertaining to LPAR 108 can be readily discovered, from the particular slot number and the above mapping.

Disks of SAN 114 are similarly connected to LPARs of server 104, through VIOS 128 thereof. Thus, FIG. 1 shows both the servers of the group connected to SAN 114. More generally, in an embodiment of the invention all servers of the group are connected to the same storage area network and to the same Layer 2 network. FIG. 1 also shows server 102 provided with a backup VIOS 122, and server 104 provided with a backup VIOS 126.

Each of the LPARs running on a server has a corresponding workload or application. Information pertaining to an LPAR and its workload must be collected periodically, and stored or persisted to withstand server failure. This is necessary to ensure that the information will be available later, if it becomes necessary to restart the LPAR on another server. It is also necessary to collect and persist information that identifies the particular LPARs that are running on each server at a given time.

Referring further to FIG. 1, it is shown that server 102 has failed. In embodiments of the invention, failure of a server in a group of servers is automatically detected, using one of several approaches. Some of these approaches are described hereinafter in connection with FIG. 2. Following detection of a failed server, it is necessary to determine which servers of the group are still operating servers, like server 104 of FIG. 1, and can thus become failover targets. A failover target is a server that has capacity available to run one or more of the LPARs from a failed server. A process for determining which servers are available to be failover targets is likewise described hereinafter in connection with FIG. 2.

When a server has failed, procedures are automatically carried out to fence or block the failed server from its storage resource and networking, in order to prevent data corruption.

Figure 2:
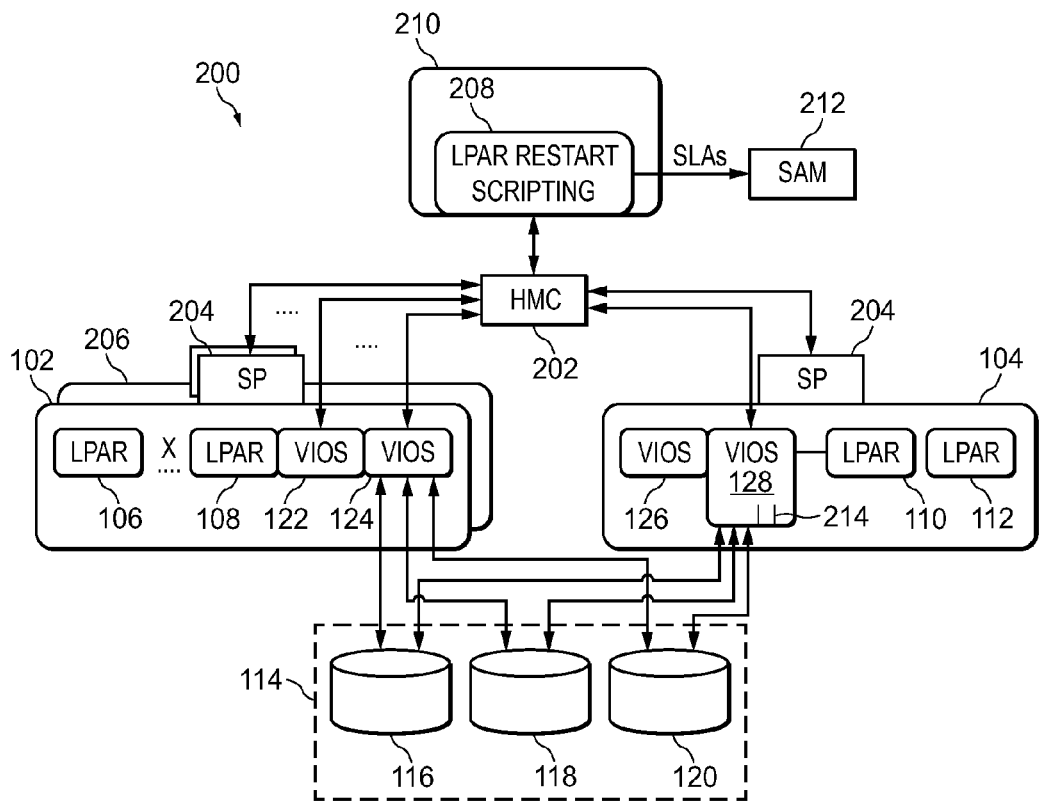
FIG. 2 is a schematic diagram showing the servers and SAN of FIG. 1, together with other components that can be used in implementing an embodiment of the invention.

Referring to FIG. 2, there is shown a system 200 for implementing restart of one or more LPARs in accordance with an embodiment of the invention, wherein the LPARs are running on a server which fails or becomes defective. The restart implementation may be highly automated, and LPARs can be restarted remotely. By way of example, FIG. 2 shows servers 102 and 104 and SAN 114 of FIG. 1, together with other components described hereinafter. One of such components is a server 206, which generically represents all remaining servers in the server group that includes server 102 and 104, as described above in connection with FIG. 1.

Each of the servers of the group has a service processor (SP) 204, which connects its server to a hardware managing component (HMC) 202. An LPAR Restart Scripting component 208, connected to HMC 202, comprises a number of restart scripts, which collectively can restart an LPAR on a failover, or destination, server. More specifically, the restart scripts operate system 200 to carry out a number of tasks or processes, described hereinafter in further detail and in accordance with an embodiment of the invention.

LPAR Restart Scripting component 208 usefully resides in an LPAR that contains a system director and virtual machines (VM) managing tool 210. The tool 210 is connected to a service automation manager (SAM) 212, which may provide important information for an embodiment of the invention as described hereinafter.

A first task of the scripts of component 208 is to periodically collect data that pertains to respective LPARs. This data is also persisted, so that it will be available if it becomes necessary to restart an LPAR on a different server. The collected data additionally pertains to information regarding all servers in the server group, the VIOS of each server, and related port number information, such as Port VLAN ID (PVID) numbers. Also of importance is data pertaining to SCSI slots for respective LPARs, as described above, and to related slot-storage partition mappings. Collected data may further include service level agreement (SLA) data for each LPAR, which is usefully supplied to the scripting component 208 from service automation manager 212.

Another task for scripting component 208 is detection of failure of one or more servers of the server group, such as server 102. This task may be carried out by polling each server at regular intervals, such as at 10 second intervals by way of example. Each polling event would query a server to determine whether the server was then operating as intended, or had failed. Upon detecting a failed server, an effort to restart LPARs on the failed server would commence. In a useful embodiment of the invention, the tasks of collecting data and polling respective servers would be combined, and carried out at a server during the same intervals.

Another approach for detecting server failure makes use of agents. By way of example, an agent could be installed on each server of a server group, on both the VIOS of a server, and/or in HMC 202. An event in any of these components that resulted in a server failure would be reported by the corresponding agent, so that failure recovery could be initiated.

As described above, server failure requires the server to be fenced or blocked from its storage resource and networking. This task may also be carried out by scripts of component 208, via command of HMC 202.

When a failed server is detected, it is necessary to determine what other servers are available to become failover targets, for running respective LPARs that had been on the failed server. For this task, scripting component 208 considers each operating server of the server group that has available capacity for running one or more additional LPARs. For a given server, this would generally depend on the LPAR workload that was already running on that server. If sufficient capacity is available on a given server for running one or more additional LPARs, that server may become a failover target and destination server for those LPARs.

In some instances, it may happen that the total capacity of all available failover targets is not sufficient to immediately restart all the LPARs that were running on the failed server. In this situation, it is necessary to adopt a priority criterion, for determining how the LPARs will be distributed over the available failover target servers for restarting, and which LPARs will have to wait to be restarted on a server. In embodiments of the invention, a useful criterion is an SLA value associated with each of the LPARs. Generally, LPARs with higher SLA values would have greater priority in being assigned to available failover target servers for restart. Use of SLA values for this purpose is described hereinafter in further detail, in connection with FIG. 5.

After respective LPARS have been sent or distributed to respective destination failover servers, the restart scripts restart the LPARs on those servers. Subsequently, the scripts may carry out failback of one or more LPARs to their original server. This could be done to restore LPARs to manageability by VM managing tool 210 and SAM 212, and also to clean up the files of the failover server. The restart scripts of component 208 accomplish the above tasks via commands to HMC 202, and via database queries to SAM 212.

Figure 3:
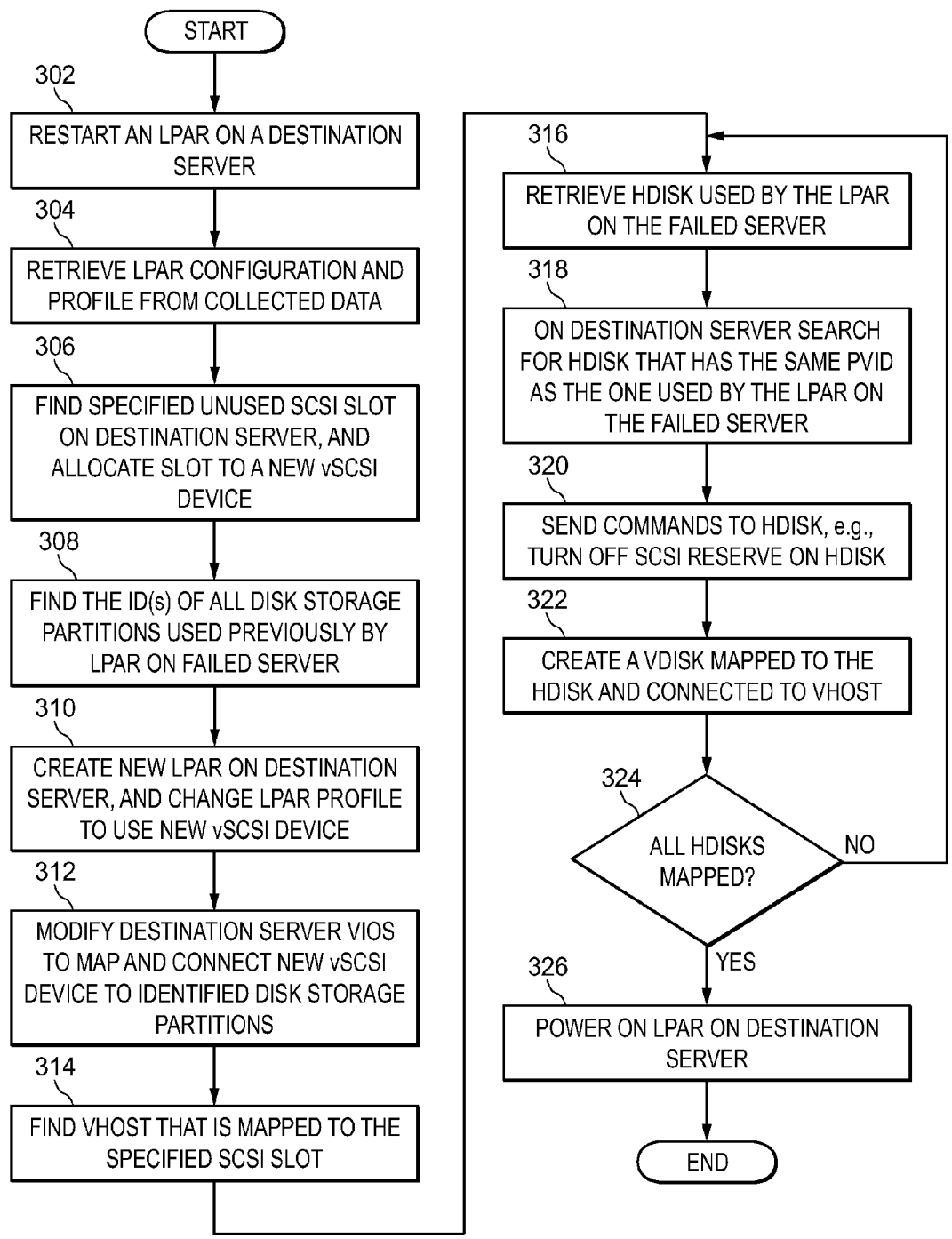
FIG. 3 is a flowchart showing steps of a method associated with an embodiment of the invention.

Referring to FIG. 3, there are shown steps of a method for restarting an LPAR on a destination server, as indicated at step 302. In accordance with embodiments of the invention, the method of FIG. 3 commences after it has been determined that an LPAR from a failed server is to be restarted on a selected operating server, which is now the destination server as described above. As an illustrative example, the LPAR and the destination server could be LPAR 108 and server 104 of FIGS. 1 and 2, respectively. The LPAR can be remotely restarted on the destination server, without being limited thereto.

The method of FIG. 3 is intended to dynamically connect disk storage partitions to the destination server for use by the LPAR, wherein each storage partition was previously used by the LPAR when the LPAR was running on the failed server. At step 304, configuration and profile data for the LPAR is retrieved from the information previously collected in regard to the LPAR, as described above in connection with FIG. 2. LPAR configuration data can include information such as the size of the LPAR, what application it is running, and its workload. Retrieved data could also include slot-storage partition mappings that pertain to the LPAR, such as a mapping of slot 132 to partition 130, as disclosed by FIG. 1. An LPAR profile could be the IP address that the LPAR uses to communicate with a storage network or other network.

Step 306 finds a specified unused SCSI slot on the destination server, and more particularly on the VIOS of the destination server. A SCSI slot 214 is pictorially represented in FIG. 2 on VIOS 128 of the destination server 104. Step 306 further includes allocating a new virtual SCSI (vSCSI) device to the specified SCSI slot, which has a particular identifying slot number.

At step 308, the names or identifiers are determined for all disk storage partitions, such as partition 130 of storage disk 116, that the LPAR 108 used to store or acquire data previously, when it was running on the failed server 102. The storage partitions can be determined from retrieved previously collected data that pertains to the LPAR running on the failed server. More particularly, the retrieved data would include all of the slot-partition mappings as described above, for each SCSI slot of the failed server that was used by the LPAR to access a disk storage partition. The name or identifier for each such partition can then be determined from the slot-partition mappings.

Step 310 creates the LPAR as a new LPAR on destination server 104. This step also changes the profile or IP address of the LPAR. This enables the LPAR to use the new vSCSI device of the specified SCSI slot to access prior disk storage partitions of the LPAR as well as other networks.

At step 312, the VIOS of the destination server is modified to connect the new vSCSI device to each of the disk storage partitions identified at step 308. The specified SCSI slot allocated to the vSCSI device is mapped to these partitions.

Step 314 requires determining the virtual host (vhost) that is mapped to the specified SCSI slot. For the example of FIG. 2, the vhost could be SAN 114. Generally, the vhost for a particular LPAR to be restarted on a server could be found from previous profile information of the LPAR, or from the previously discovered storage partition identifiers. Alternatively, known storage area networks could be queried, for information pertaining to prior activity of the LPAR.

At step 316, an hdisk used by the LPAR on the failed server must be retrieved. As used herein, an hdisk is identified by providing a particular network name for a network storage device, together with a port number used with the device. Usefully, the port number may be a port VLAN identifier (PVID) number. By way of example, if the network device was one of the disks of SAN 114, such as disk 116, its name would be known. The PVID number which the LPAR used with that device on the failed server could then be determined, by retrieving previously collected data regarding the LPAR.

At step 318, the destination server is searched for an hdisk, comprising a device of the particular name or type, which has the same PVID as was used previously by the LPAR on the failed server. When the hdisk is located on the destination server, the LPAR is able to communicate with the hdisk and send commands thereto. Step 320 indicates, by way of example, sending a command to turn off the SCSI reserve on the hdisk.

Step 322 creates a vdisk that is mapped to the hdisk and connected to the vhost. This may be implemented by mapping a network name for a selected virtual device, and a port number for the hdisk, at the virtual device to the SCSI slot.

Decision step 324 queries whether or not all hdisks have been mapped as described above. If not, the method of FIG. 3 returns to step 316. Otherwise, the method proceeds to step 326, which powers the LPAR on to the destination server. The method then ends.

As described above, a feature of embodiments of the invention is dynamically reconnecting a storage disk or other data storage resource to a failover destination server, wherein the disk was previously used by an LPAR on a failed server, and the LPAR is about to be restarted on the destination server. The reconnection transfer of the storage disk is dynamic, in that it takes place during migration of the LPAR from the failed server to the destination server, which is typically a very brief time period. Steps of FIG. 3 can be usefully employed to implement this dynamic process.

Figure 4:
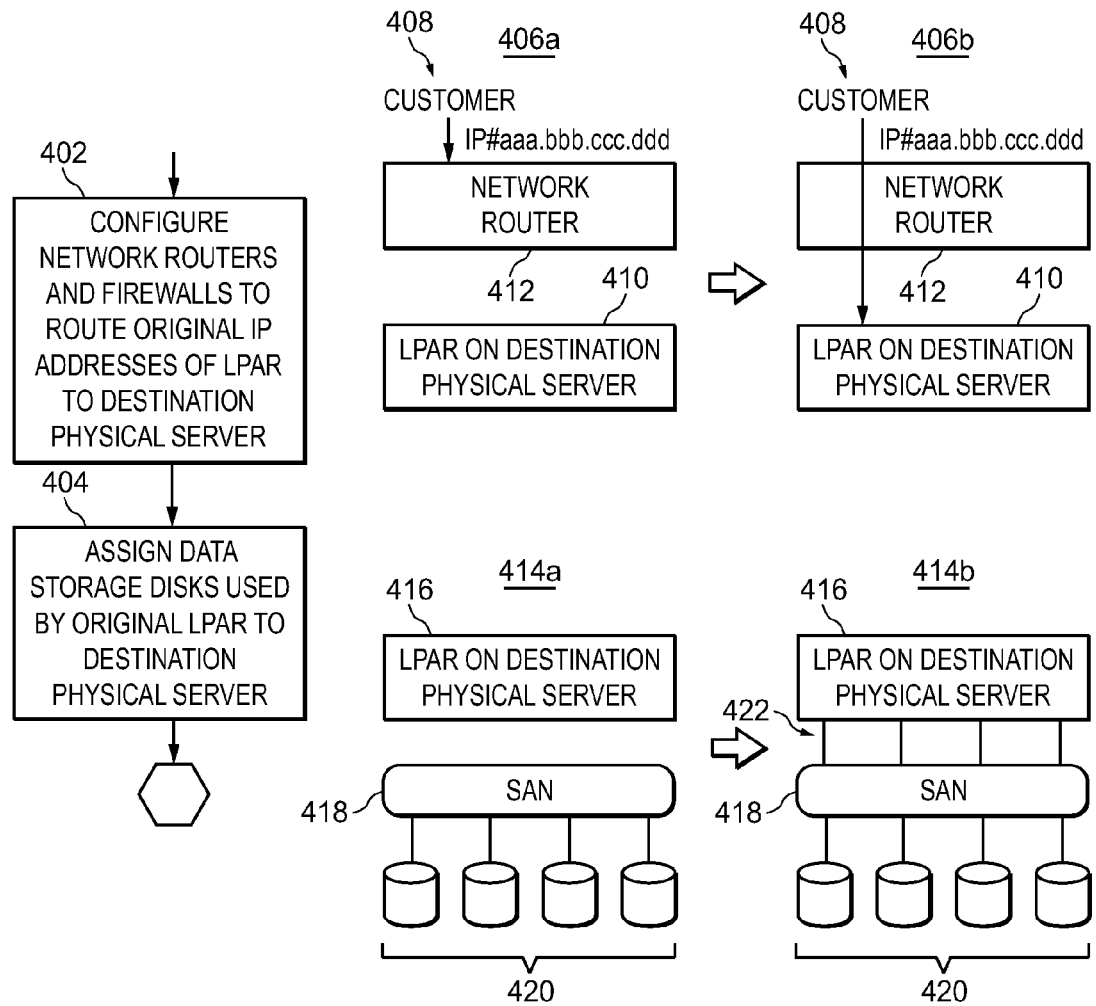
FIG. 4 is a schematic diagram illustrating certain tasks associated with LPAR restart and storage disk configuration for an embodiment of the invention.

Referring to FIG. 4, there is shown a schematic diagram that illustrates and emphasizes two of the tasks that are carried out to restart an LPAR on a destination server, in accordance with an embodiment of the invention. The restart may be implemented remotely. As described above, after being restarted on a destination server, an LPAR must remain in communication with a storage network and/or other networks or entities. This is addressed by task 402. More particularly, network routers and firewalls associated with the network are configured to route original IP addresses of the LPAR to the destination server. Inputs for this process include IP addresses of the LPAR at the destination server, and IP addresses of network routers and firewalls.

Task 402 is shown further by illustrations 406*a* and 406*b*. More particularly, customer 408 must be able to communicate with a restarted LPAR on a destination server over a network that includes a router 412. After configuring the router to route messages as specified by task 402, the customer is still able to communicate with the LPAR on the destination server, using the original IP address as shown by illustration 406*b*.

Referring further to FIG. 4, the second task 404 is assigning data storage disks, or disk partitions, used by the original LPAR on the failed server to the destination server. This task was described above, such as in connection with FIG. 3. Inputs for the task include a list of disks or disk partitions used by the LPAR on the failed server and the IP address of a storage management appliance such as a SAN disk.

Illustration 414*a* shows an LPAR to be restarted on a destination server 416, a SAN 418 and SAN disks 420. Illustration 414*b* shows the same features, and further shows connections 422 established between destination server 416 and disks of SAN 418. This is a result of carrying out task 404.

Figure 5:
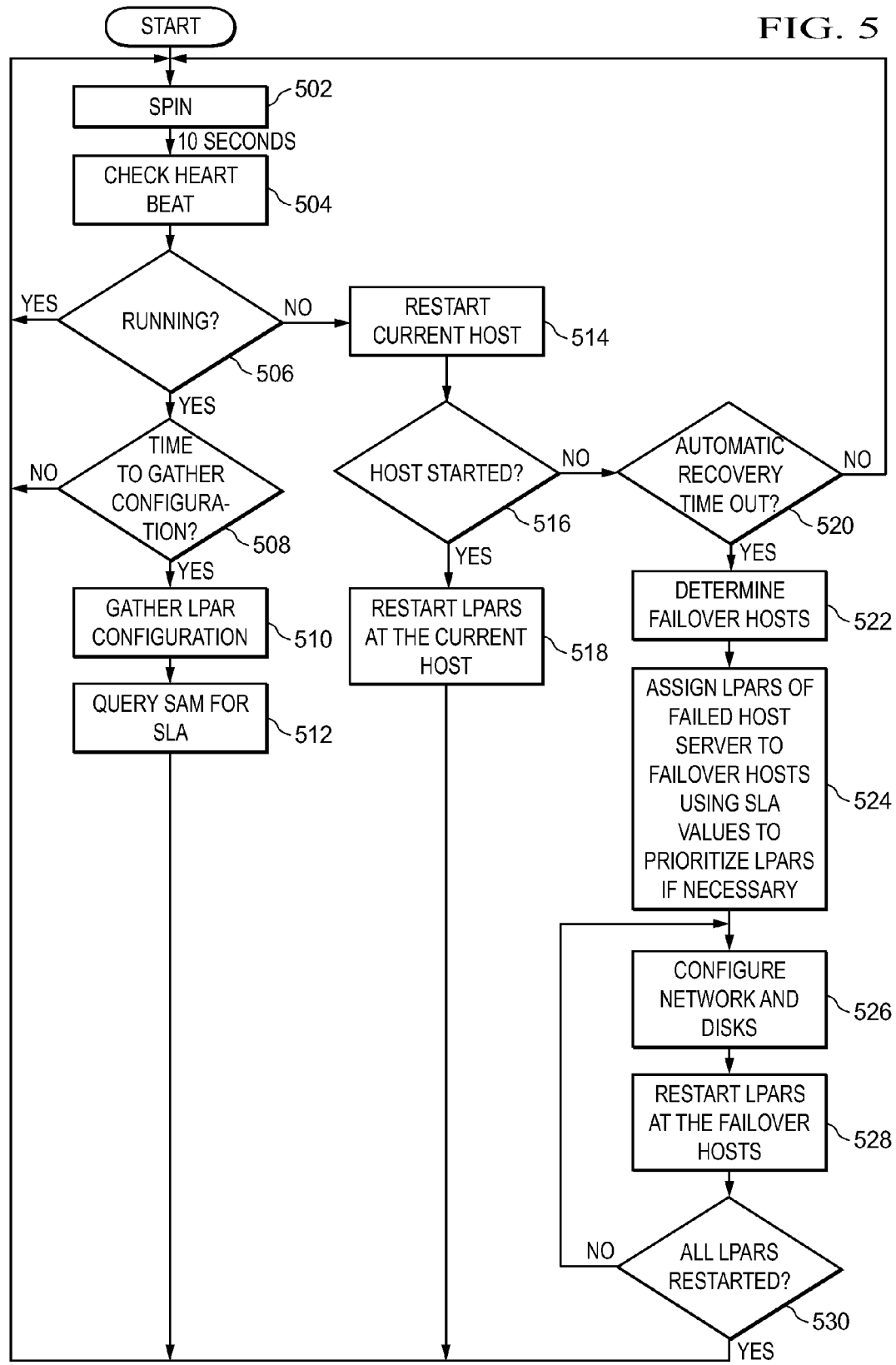
FIG. 5 is a flowchart showing further steps of a method pertaining to an embodiment of the invention.

Referring to FIG. 5, there is shown a flowchart depicting further or more detailed steps of a method pertaining to an embodiment of the invention. FIG. 5 in particular shows steps pertaining to certain features of embodiments of the invention as described above. When the method is started, a spin step 502 operates at specified intervals, for example 10 second intervals, to poll or check the heartbeat of each server in a group of servers. This action is carried out at step 504, and is applied to LPAR host servers exemplified by servers 102 and 104 of FIGS. 1 and 2. Such action was also described above, in connection with FIG. 2. At decision step 506 it is necessary to determine whether the polled host server is or is not running. If it is, the method returns to step 502, to poll the next server. In addition, the method proceeds to decision step 508.

Step 508 determines whether it is time to gather configuration data running on the server checked or polled at step 504. If not, the method returns to spin step 502. Otherwise, the method proceeds to step 510, to gather configuration data for respective LPARs running on the server. This step may include collection of LPAR data, as described above in connection with FIG. 2. Configuration step 510 is carried out during a specified configuration time, which may be 60 minutes by way of example and not limitation.

At step 512, a component such as SAM 212 of FIG. 2 may be queried, to update SLA information for respective LPARs of the server. The method then goes back to spin step 502.

Returning to decision step 506, if it is determined that a host server being checked has failed and is not running, an effort is made at step 514 to restart the host server. Decision step 516 determines whether this effort was successful. If so, LPARs running on the host server are restarted at step 518, and the method goes back to spin step 502.

If the host server is found at step 516 to not be running, a time limited automatic recovery period is commenced, which may be 10 minutes by way of example and not limitation. Decision step 520 then determines whether or not the recovery effort has timed out of the recovery period. A negative response indicates that the server host has successfully restarted, and the method returns to spin step 502. However, an affirmative decision at step 520 indicates that the host server is still not running, even though the period has timed out. Accordingly, the method proceeds to step 522.

At step 522, one or more failover server hosts must be determined, for use in restarting LPARs that were running on the host that was just determined to be a failed server. This task can be carried out as described above, for example in connection with FIG. 2.

Moreover, as also described above, the total capacity of currently available failover host servers may only be enough to restart some of the LPARs from the failed server, and not all of them. In this situation, respective LPARs must be prioritized, so that the higher priority LPARs will be restarted at a failover host server.

FIG. 5 shows that this situation is addressed at step 524. In the event that it becomes necessary to prioritize LPARs of a failed host server, for reasons as described above or otherwise, this step uses SLA values to set priorities.

As is known by those of skill in the art, when an LPAR is running on a server to implement a particular workload or application, it is common to apply an SLA percentage value to the LPAR, or virtual machine (VM). The percentage value generally indicates the amount of time during which the processing task of the LPAR must be carried out without defect or error. In one system, a bronze SLA is 98.5% of the time without error, and a platinum SLA is 99.99% of the time. These values indicate that the processing effort of an LPAR having the platinum SLA value is considered to be more important than the effort of an LPAR with a bronze SLA value. Accordingly, the LPAR with the platinum SLA value should have priority in being restarted on a failover host server.

In the above example, SLA value was based on the workload or application of respective LPARs. However, SLA values for prioritizing LPARs could alternatively use other types of measurement bases. For example, an LPAR may be used to work with an accounting database. Accordingly, operations of this LPAR could be much more important to an organization than other LPARs, which worked with databases having other types of data. Thus, SLA values could be based on different types of content in different databases, including disk storage partition databases. SLA values could also be based on PVID numbers for different LPARs, or the vhost used for different LPARs.

Following assignment of LPARs to failover host servers at step 524, step 526 configures the network and storage disks or disk partitions associated with respective LPARs. This may be carried out, for example, as described above in connection with FIGS. 3 and 4.

Step 528 restarts each LPAR or virtual machine at its new failover host server. Decision step 530 then seeks to confirm that all LPARs have in fact been restarted. If not, the method returns to step 526, and otherwise goes back to spin step 502.

Figure 6:
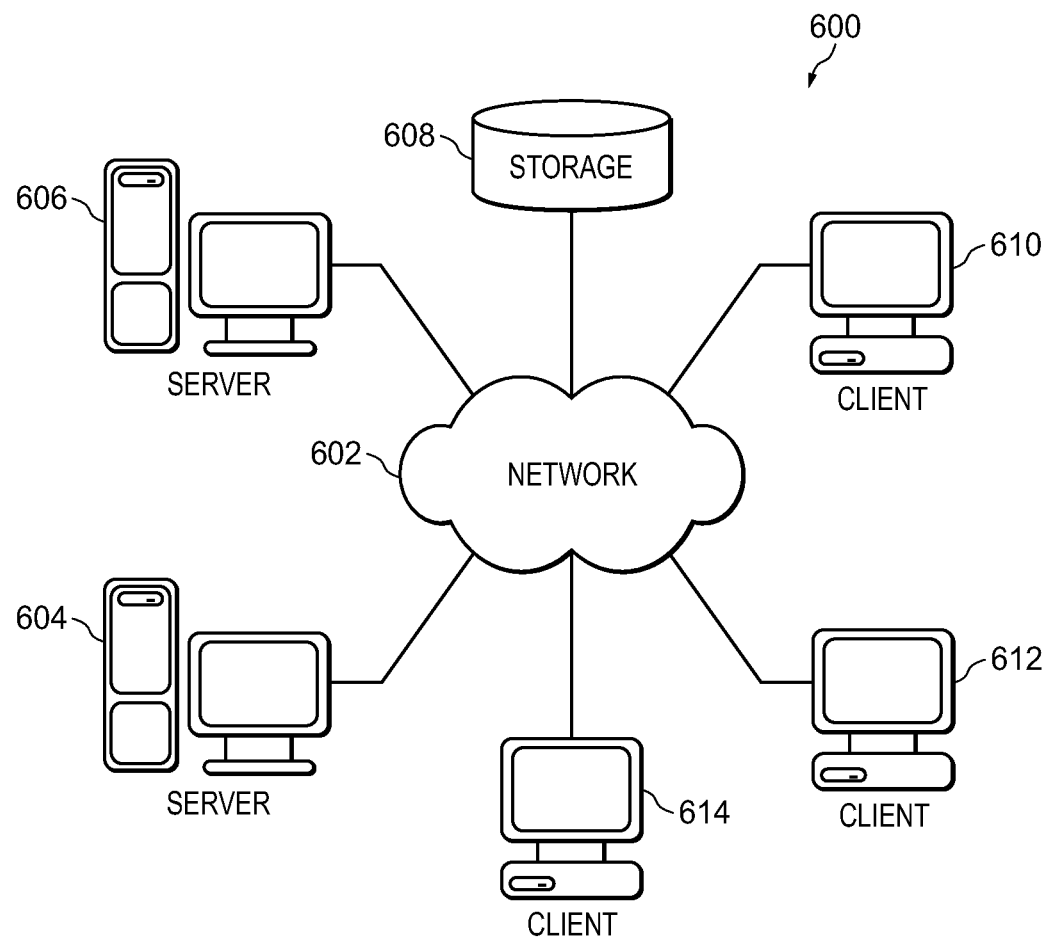
FIG. 6 is a block diagram showing a network of data processing systems in which an embodiment of the invention may be implemented.

FIG. 6 is a pictorial representation of a network of data processing systems in which illustrative embodiments of the invention may be implemented. Network data processing system 600 is a network of computers in which the illustrative embodiments may be implemented. Network data processing system 600 contains network 602, which is the medium used to provide communications links between various devices and computers connected together within network data processing system 600. Network 602 may include connections, such as wire, wireless communication links, or fiber optic cables.

In the depicted example, server computer 604 and server computer 606 connect to network 602 along with storage unit 608. In addition, client computers 610, 612, and 614 connect to network 602. Client computers 610, 612, and 614 may be, for example, personal computers or network computers. In the depicted example, server computer 604 provides information, such as boot files, operating system images, and applications to client computers 610, 612, and 614. Client computers 610, 612, and 614 are clients to server computer 604 in this example. Network data processing system 600 may include additional server computers, client computers, and other devices not shown.

Program code located in network data processing system 600 may be stored on a computer-recordable storage medium and downloaded to a data processing system or other device for use. For example, program code may be stored on a computer-recordable storage medium on server computer 604 and downloaded to client computer 610 over network 602 for use on client computer 610.

In the depicted example, network data processing system 600 is the Internet with network 602 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 600 also may be implemented as a number of different types of networks, such as, for example, an intranet, a local area network (LAN), or a wide area network (WAN). FIG. 6 is intended as an example, and not as an architectural limitation for the different illustrative embodiments.

Turning now to FIG. 7, an illustration of a data processing system is depicted in accordance with an illustrative embodiment. In this illustrative example, data processing system 700 includes communications fabric 702, which provides communications between processor unit 704, memory 706, persistent storage 708, communications unit 710, input/output (I/O) unit 712, and display 714.

Processor unit 704 serves to process instructions for software that may be loaded into memory 706. Processor unit 704 may be a number of processors, a multi-processor core, or some other type of processor, depending on the particular implementation. "A number," as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for processing by processor unit 704. The processes of the different embodiments may be performed by processor unit 704 using computer-implemented instructions, which may be located in a memory, such as memory 706.

These instructions are referred to as program code, computer usable program code, or computer readable program code that may be read and processed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for processing by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700.

In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, a remote data processing system, or some other device capable of storing and transmitting program code 718. For example, program code stored in the computer readable storage medium in data processing system 700 may be downloaded over a network from the remote data processing system to the computer readable storage medium in data processing system 700. Additionally, program code stored in the computer readable storage medium in the server computer may be downloaded over the network from the server computer to a computer readable storage medium in the remote data processing system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In a computer environment wherein logical partitions (LPARs) can be run on any server in a specified group of servers, a computer implemented method comprising:
   responsive to detecting a failed server in the specified group of servers, identifying a plurality of LPARs which had been running on the failed server;
   determining available servers having available capacity for running one or more additional LPARs in the specified group of servers to restart the identified plurality of LPARs which had been running on the failed server;
   responsive to determining that a number of the identified plurality of LPARs which had been running on the failed server exceeds a total capacity of the available servers having the available capacity for running one or more additional LPARs in the specified group of servers to restart all of the identified plurality of LPARs, determining a first portion of the identified plurality of LPARs that have to wait to be restarted and assigning a second portion of the identified plurality of LPARs for restart on the available servers having the available capacity for running one or more additional LPARs, wherein each identified LPAR has a value associated with a specified LPAR priority criterion, and wherein priority of assigning a given identified LPAR to the available servers is based on its corresponding value, the value comprising a first value representing an amount of time during which processing work of the given identified LPAR must be carried out without error and a second value comprising a port number of the given identified LPAR; and
   responsive to assigning the given identified LPAR to a given available server, connecting a specified storage resource to the given available server in association with the given identified LPAR, wherein the specified storage resource was previously connected to the failed server in association with the given identified LPAR.

2. The method of claim 1, wherein:
the specified storage resource is dynamically reconnected from the failed server to the given available server, during migration of the given identified LPAR from the failed server to the given available server.

3. The method of claim 1, wherein:
the specified storage resource has a unique first identifier, and wherein the specified storage resource was connected to the failed server by a server connection element having a unique second identifier, and wherein the unique first identifier of the specified storage resource is determined from data comprising a mapping of the unique second identifier to the unique first identifier.

4. The method of claim 3, wherein:
the specified storage resource comprises a specified data storage partition of a disk included in a storage area network.

5. The method claim 3, wherein:
the server connection element comprises a specified small computer system interface (SCSI) slot in a virtual I/O server (VIOS) of the failed server.

6. The method of claim 1, wherein:
a VIOS of the given available server includes a SCSI slot that is allocated to a virtual SCSI (vSCSI) device, and wherein the vSCSI device is used in connecting the specified storage resource for use by the given available server.

7. The method of claim 1, wherein:
the given identified LPAR was connected to receive a specified IP address over a specified network when the given identified LPAR was running on the failed server, and wherein the specified network includes a network router and a firewall, and wherein at least one of the router and the firewall routes the specified IP address to the given identified LPAR when the given identified LPAR is restarted on the given available server.

8. The method of claim 1, wherein:
an IP address of the given identified LPAR is changed to enable the given identified LPAR to access a specified network when the given identified LPAR is restarted on the given available server.

9. In a computer environment wherein logical partitions (LPARs) can be run on any server in a specified group of servers, a computer program product comprising a computer readable storage medium having program instructions embodied therewith that are executable by a computer, the program instructions comprising:
   program instructions, responsive to detecting a failed server in the specified group of servers, for identifying a plurality of LPARs which had been running on the failed server;
   program instructions for determining available servers having available capacity for running one or more additional LPARs in the specified group of servers to restart the identified plurality of LPARs which had been running on the failed server;

program instructions, responsive to determining that a number of the identified plurality of LPARs which had been running on the failed server exceeds a total capacity of the available servers having the available capacity for running one or more additional LPARs in the specified group of servers to restart all of the identified plurality of LPARs, for determining a first portion of the identified plurality of LPARs that have to wait to be restarted and assigning a second portion of the identified plurality of LPARs for restart on the available servers having the available capacity for running one or more additional LPARs, wherein each identified LPAR has a value associated with a specified LPAR priority criterion, and wherein priority of assigning a given identified LPAR to the available servers is based on its corresponding value, the value comprising a first value representing an amount of time during which processing work of the given identified LPAR must be carried out without error and a second value comprising a port number of the given identified LPAR; and program instructions, responsive to assigning the given identified LPAR to a given available server, for connecting a specified storage resource to the given available server in association with the given identified LPAR, wherein the specified storage resource was previously connected to the failed server in association with the given identified LPAR.

10. The computer program product of claim 9, wherein: the specified storage resource is dynamically reconnected from the failed server to the given available server, during migration of the given identified LPAR from the failed server to the given available server.

11. The computer program product of claim 9, wherein: the specified storage resource has a unique first identifier, and wherein the specified storage resource was connected to the failed server by a server connection element having a unique second identifier, and wherein the unique first identifier of the specified storage resource is determined from data comprising a mapping of the unique second identifier to the unique first identifier.

12. The computer program product of claim 11, wherein: the specified storage resource comprises a specified data storage partition of a disk included in a storage area network.

13. The computer program product of claim 11, wherein: the server connection element comprises a specified small computer system interface (SCSI) slot in a virtual I/O server (VIOS) of the failed server.

14. The computer program product of claim 9, wherein: a VIOS of the given available server includes a SCSI slot that is allocated to a virtual SCSI (vSCSI) device, and wherein the vSCSI device is used in connecting the specified storage resource for use by the given available server.

15. The computer program product of claim 9, wherein: the given identified LPAR was connected to receive a specified IP address over a specified network when the given identified LPAR was running on the failed server, and wherein the specified network includes a network router and a firewall, and wherein at least one of the router and the firewall routes the specified IP address to the given identified LPAR when the given identified LPAR is restarted on the given available server.

16. In a computer environment wherein logical partitions (LPARs) can be run on any server in a specified group of servers, a computer system comprising:

a bus;

a memory connected to the bus, wherein the memory stores program instructions; and a processor unit connected to the bus, wherein the processor unit executes the program instructions:

responsive to detecting a failed server in the specified group of servers, to identify a plurality of LPARs which had been running on the failed server;

to determine available servers having available capacity for running one or more additional LPARs in the specified group of servers to restart the identified plurality of LPARs which had been running on the failed server;

responsive to determining that a number of the identified plurality of LPARs which had been running on the failed server exceeds a total capacity of the available servers having the available capacity for running one or more additional LPARs in the specified group of servers to restart all of the identified plurality of LPARs, to determine a first portion of the identified plurality of LPARs that have to wait to be restarted and assign a second portion of the identified plurality of LPARs for restart on the available servers having the available capacity for running one or more additional LPARs, wherein each identified LPAR has a value associated with a specified LPAR priority criterion, and wherein priority of assigning a given identified LPAR to the available servers is based on its corresponding value, the value comprising a first value representing an amount of time during which processing work of the given identified LPAR must be carried out without error and a second value comprising a port number of the given identified LPAR; and responsive to assigning the given identified LPAR to a given available server, to connect a specified storage resource to the given available server in association with the given identified LPAR, wherein the specified storage resource was previously connected to the failed server in association with the given identified LPAR.

* * * * *